United States Patent [19]

Gellert

[11] Patent Number: 4,919,606
[45] Date of Patent: Apr. 24, 1990

[54] INJECTION MOLDING RACK AND PINION VALVE PIN ACTUATING MECHANISM

[76] Inventor: Jobst U. Gellert, 7A Prince Street, Georgetown, Ontario, Canada, L7G 2X1

[21] Appl. No.: 287,161

[22] Filed: Dec. 21, 1988

[51] Int. Cl.⁵ .............................................. B29C 45/20
[52] U.S. Cl. .................................. 425/549; 264/328.9; 264/328.15; 425/562; 425/564; 425/566
[58] Field of Search ............... 425/549, 552, 562, 563, 425/564, 566, 570, 571, 572, 573, 588; 264/328.9, 328.15

[56] References Cited

U.S. PATENT DOCUMENTS

| | | | |
|---|---|---|---|
| 3,912,133 | 10/1975 | Hehl | 425/563 |
| 4,053,271 | 10/1977 | Gellert | 425/562 |
| 4,222,733 | 9/1980 | Gellert et al. | 425/566 |
| 4,286,941 | 9/1981 | Gellert | 425/566 |
| 4,380,426 | 4/1983 | Wiles | 425/566 |
| 4,433,969 | 2/1984 | Gellert | 425/549 |
| 4,451,974 | 6/1984 | Gellert | 425/549 |
| 4,609,138 | 9/1986 | Harrison | 425/572 |
| 4,755,131 | 7/1988 | Schmidt | 425/566 |

OTHER PUBLICATIONS

SVG 5000, SVG 7000, H. Muller Mekaniska AB Flytgot Typn.
Precision Products GmbH Delta, Spritzduse mit Hydraulicverschluss.

Primary Examiner—James C. Housel
Assistant Examiner—Timothy W. Heitbrink
Attorney, Agent, or Firm—Riches, McKenzie & Herbert

[57] ABSTRACT

A valve gated injection molding system having a double acting pneumatic rack and pinion valve pin actuating mechanism. The melt passage branches in a manifold from a central inlet and flows along the valve pin in a central bore in the nozzle to the gate. A pneumatically driven piston pivots a toothed pinion member mounted in a slot in the manifold. The pinion member engages a toothed rack member which reciprocates along a straight line in the slot in the manifold and engages an enlarged head of the valve pin in a slot in the rack member. Lateral forces from the pinion member are absorbed by sliding contact of surfaces of the rack member against matching surfaces of the slot and/or a valve pin bushing, and are not transmitted to the valve pin. This avoids uneven wear and buildup of melt deposits around the valve pin which can otherwise result in leakage and malfunction.

13 Claims, 3 Drawing Sheets

INJECTION MOLDING RACK AND PINION VALVE PIN ACTUATING MECHANISM

BACKGROUND OF THE INVENTION

This invention relates generally to injection molding and more particularly to a valve gated hot runner injection molding system having a pneumatically driven rack and pinion valve pin actuating mechanism.

Valve gated injection molding systems are well known in the art, as are the related problems of valve pin actuating mechanisms. Actuating mechanisms are usually either lever operated or piston operated. A lever operated mechanism is shown in the applicant's U.S. Pat. No. 4,222,733 which issued Sept. 16, 1980. While this arrangement is satisfactory for many applications, it has the disadvantage that the lever unavoidably applied a lateral force to the reciprocating valve pin which causes friction, uneven wear and a larger gap on one side than the other. As a result, during the operating life of the system there is an uneven buildup of melt deposits around the valve pin which can cause leakage and malfunction. Other examples of lever operated valve pin mechanisms having similar problems are shown in the following brochures; Incoe "SVG 5000, SVG 7000", H. Muller Mekaniska AB "Flytgot Typ N" and "Precision Products GmbH Delta" Spritzduse Mit Hydraulicverschluss.

Actuating mechanisms having a piston connected directly to the valve pin have been used to overcome these problems associated with lever operated mechanisms. Examples of such piston operated mechanisms are shown in U.S. Pat. Nos. 4,380,426 to Wiles which issued Apr. 19, 1983, 4,433,969 to the applicant which issued Feb. 24, 1984 and 4,755,131 to Schmidt which issued July 5, 1988. While these piston operated systems do reduce the lateral forces applied to the valve pin they have the disadvantage that they are relatively costly to make and require a considerable amount of space around the valve pin head to which the piston is connected. This is particularly a problem in providing for the melt passage in a center entry single nozzle system as described in U.S. Pat. No. 4,380,426 referred to above. Also, many of the piston operated systems are hydraulically driven which has the additional problems of hot seals and continuing to circulate the oil for cooling after shut down. Furthermore, in a stack molding configuration the additional height required for the actuating mechanism is a considerable disadvantage.

SUMMARY OF THE INVENTION

Accordingly, it is an object of the invention to at least partially overcome the problems of the prior art by providing a pneumatically driven rack and pinion valve pin actuating mechanism for a hot runner injection molding system.

To this end, in one of its aspects, the invention provides a valve gated hot runner injection molding system having a heated nozzle which is seated in a cavity plate and secured to a heated manifold, a pneumatically activated elongated valve pin which reciprocates longitudinally between a retracted open position and a forward closed position in a central bore in the nozzle which is in alignment with a gate extending through the cavity plate to a cavity, the valve pin having a driven end and a tip end which seats in the gate in the closed position, a melt passage to convey pressurized melt from an inlet in the manifold to the gate which extends through the manifold and along the valve pin in the central bore of the nozzle, and a valve pin bushing which is seated in the nozzle with a rearwardly extending portion which projects into the manifold, the valve pin bushing having a valve pin bore extending therethrough in alignment with the central bore of the nozzle to receive the valve pin therethrough to prevent substantial leakage of the pressurized melt around the reciprocating valve pin, the improvement wherein a rack member longitudinally slidably received in an opening in the manifold to engage the driven end of the valve pin, the rack member having a toothed portion with a longitudinal row of teeth which face outwardly in the radial opening, a pivotally mounted pinion member with a plurality of teeth which engage the teeth of the rack member, and double acting pneumatic actuating means connected to pivot the pinion member through a predetermined angle according to a predetermined cycle whereby the rack member and the valve pin are reciprocated longitudinally between the open and closed positions.

Further objects and advantages of the invention will appear from the following description, taken together with the accompanying drawings.

DETAILED DESCRIPTION OF THE DRAWINGS

Figure 1:
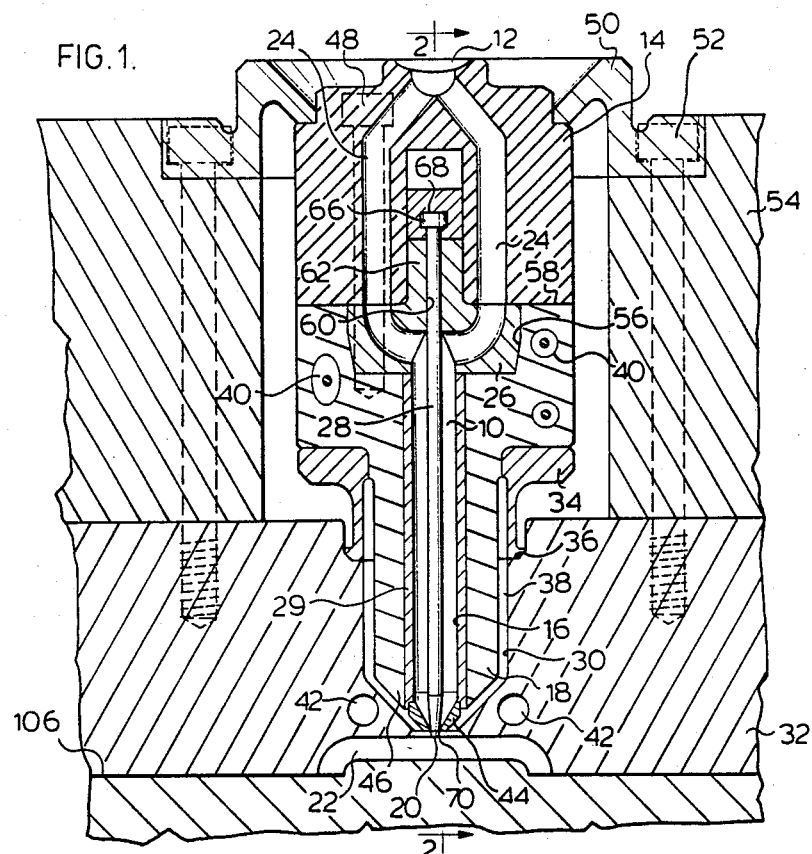
FIG. 1 is a sectional view of a portion of an injection molding system according to one embodiment of the invention showing the melt flow passage.

Reference is first made to FIG. 1 which shows a valve gated injection molding system having a melt passage 10 which extends from a central inlet 12 in a manifold 14, through a central bore 16 of a nozzle 18 and a gate 20 to a cavity 22. As can be seen, in this embodiment the melt passage 10 branches from the central inlet 12 into two channels 24 around the valve pin actuating mechanism, rejoins in a valve pin bushing 26 which is seated in the nozzle 18, and extends along the valve pin 28 in the central bore 16 which is considerably larger in diameter than the valve pin 28. The central bore 16 extends through a stainless steel liner 29 similar to that shown in the applicant's U.S. Pat. No. 4,451,974 which issued June 5, 1984.

The nozzle 18 is seated in a well 30 in the cavity plate 32 by an insulation flange or bushing 34 which abuts against a circumferential shoulder 36. This accurately locates the nozzle 18 with the central bore 16 in alignment with the gate 20 and provides an insulative air space 38 between the nozzle 18 and the surrounding cavity plate 32. The nozzle 18 has an electrical heating element 40 which is integrally cast into it and the cavity plate 32 is cooled by pumping cooling water through cooling conduits 42. An injection molding nozzle seal 44 as described in the applicant's U.S. Pat. No. 4,286,941 which issued Sept. 1, 1981 is seated in the nose portion 46 of the nozzle 18 and bridges the air space 38 around the gate 20 to prevent the air space 38 filling with melt.

The manifold 14 is secured in correct alignment to the nozzle 18 by bolts 48. The nozzle 18 and manifold 14 are in turn held in place by a locating ring 50 which is secured by bolts 52 extending through the support plate 54 into the cavity plate 32.

The valve pin busing 26 is securely seated in an opening 56 in the rear face 58 of the nozzle 18 and has a valve pin bore 60 extending therethrough in alignment with the central bore 16 through the nozzle 18. As described in U.S. Pat. No. 4,433,969, the valve pin bore 60 which extends into a rearwardly projecting portion 62 is of sufficient length and fits snugly enough around the valve pin 28 to seal against leakage of the pressurized melt around the valve pin 28 as it reciprocates. As can be seen, the valve pin bushing 26 is shaped to connect the two channel 24 of the melt passage 10 to the central bore 16 through the nozzle 18. The valve pin bushing 26 and the opening 56 in which it is seated in the nozzle 18 are oblong shaped to accurately align it, and the rearwardly projecting portion 62 has an outwardly facing flat surface 64.

The elongated valve pin 28 has an enlarged head 66 at the driven end 68 and a tip end 70 which seats in the gate 20 in the forward closed position. The manifold 14 is heated by an electrical heating element 72 which is integrally brazed into it. The manifold 14 is made with a slot or radial opening 74 which receives the rearwardly projecting portion 62 of the valve pin bushing 26 and the rack member 76. The rack member 76 has a T-slot 78 which engages the enlarged head 66 of the valve pin 28 and a toothed portion 80 with a row of outwardly facing teeth 82. The slot 74 in the manifold 14 extends radially outward to receive the pinion member 84 which is pivotally mounted on a pivot pin 86 which extends into the manifold 14 on opposite sides of the slot 74. The pinion member 84 also has teeth 88 which engage the teeth 82 of the rack member 76 and a pivot arm 90 which extends outwardly through the mouth 92 of the slot 74. The pivot arm 90 is connected by a rod 94 to a double-acting piston 96 which is driven by air received through hoses (not shown) to connectors 98 to reciprocate in a pivotally mounted cylinder 100. While the pivot arm 90 is curved in this embodiment to match the location of the cylinder 100 and piston 96, other suitable arrangements can be used to drive the pinion member 84.

Figure 2:
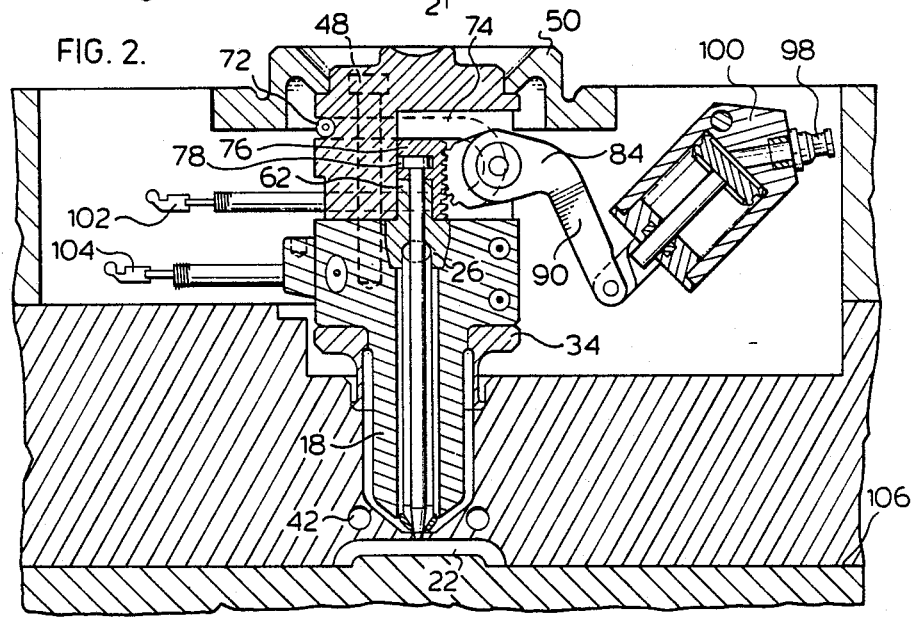
FIG. 2 is a sectional view taken along line 2—2 in FIG. 1 showing the actuating mechanism with the valve pin in the closed position.
Figure 3:
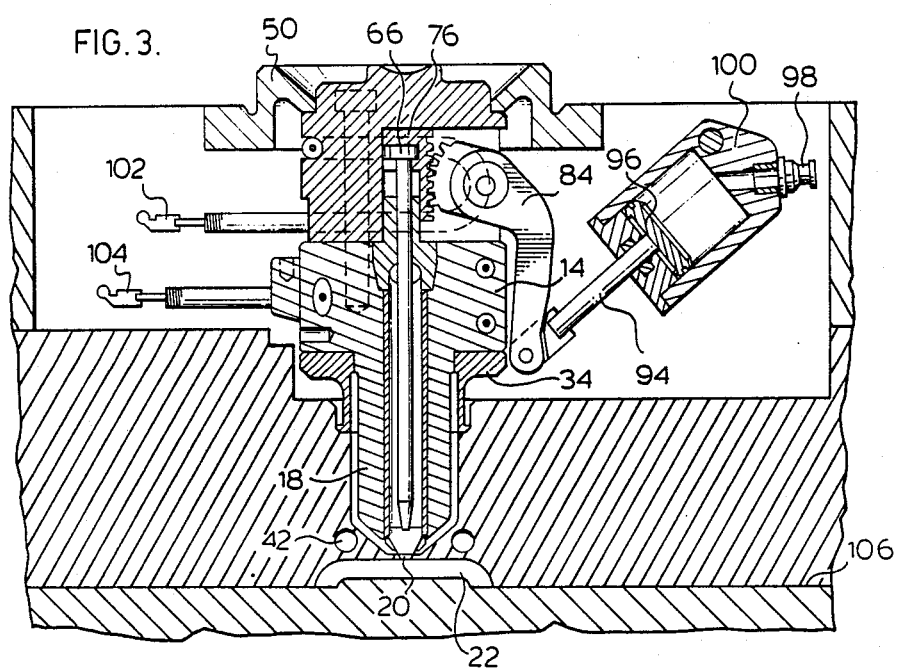
FIG. 3 is a similar view to FIG. 2 showing the valve pin in the open position.
Figure 4:
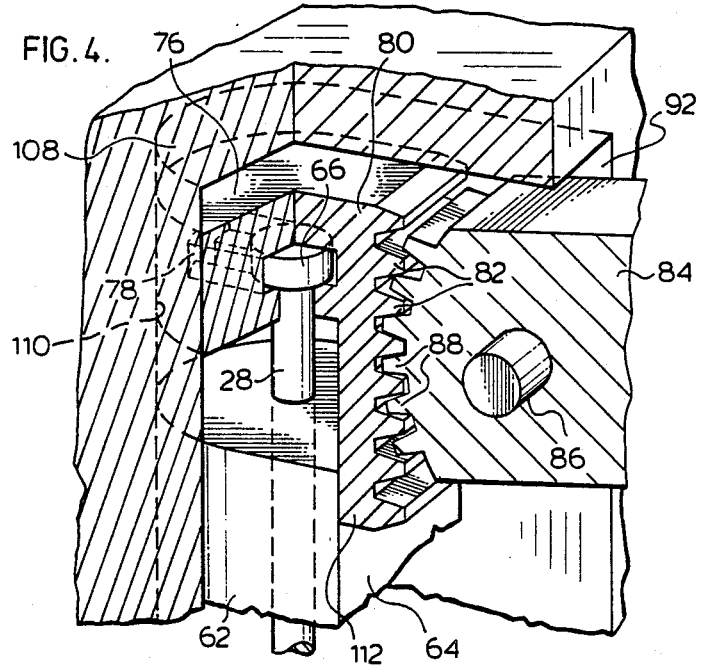
FIG. 4 is a cut-away isometric view showing how the rack member is received in the manifold.

In use, the system is assembled as shown and electrical power is applied to the terminals 102,104 of the heating elements 40,72 to heat the manifold 14 and the nozzle 18 to a predetermined operating temperature. Pressurized melt from a molding machine (not shown) is introduced into the melt passage 10 through the central inlet 12 according to a predetermined cycle and controlled pneumatic pressure is applied through the hoses to the connectors 98 to operate the piston 96 according to a matching cycle. When the piston 96 pivots the pinion member 84 to the open position shown in FIG. 3, the rack member 76 and the valve pin 28 slide rearwardly to withdraw the tip end 70 from the gate 20. The pressurized melt flows through the melt passage 10 along the valve pin 28, through the gate 20 and fills the cavity 22. After the cavity is filled, injection pressure is held momentarily to pack and then the piston 96 pivots the pinion member 84 to the closed position shown in FIG. 2. This causes the rack member 76 and the valve pin 28 to slide forwardly until the tip end 70 is seated in the matching gate 20. Injection pressure is then released and after a short cooling period, the mold is opened along the parting line 106 to eject the molded product. After ejection, the mold is closed, pneumatic pressure is applied to the cylinder 100 to withdraw the valve pin 28 to the open position, and injection pressure is reapplied to refill the cavity 22. This cycle is repeated continuously with a frequency dependent upon the size of cavity and type of material being molded.

As the valve pin 28 is reciprocated between the open and closed positions, the teeth 88 of the pinion member 84 engage and drive the teeth 82 of the rack member 76. While this unavoidably results in the application of some lateral force to the rack member 76, this lateral force is absorbed by contact between the inward surface 108 of the rack member 76 and the matching surface 110 of the radial opening or slot 74 in the manifold 14 against which it abuts as it slides. The shape of the slot 74 also keeps the rack member 76 and the pinion member 84 in place so the teeth 82,88 remain in alignment. Some of the lateral force applied to the rack member 76 is also absorbed by sliding contact between a flat inwardly facing surface 112 of the toothed portion 80 of the rack member 76 and the outwardly facing flat surface 64 of the rearwardly projecting portion 62 of the valve pin bushing 26. Thus, the rack member 76 travels along a substantially straight line as it reciprocates between the open and closed positions which avoids the application of lateral forces or stress to the driven end 68 of the valve pin 28. The relatively loose receipt or engagement of the enlarged head 66 of the valve pin 28 in the slot 78 in the rack member 76 further ensures that lateral forces are not transmitted to the valve pin 28 by the rack member 76. This allows the valve pin 28 to reciprocate in the center of the valve pin bore 60 through the valve pin bushing 26 without being displaced to one side. This avoids leakage and malfunction due to uneven wearing and displacement around the reciprocating valve pin 28. The double acting actuation of the valve pin allows the valve pin to be opened before injection pressure is applied which avoids a thin film of semicold plastic being injected when injection is initiated which is very advantageous for cosmetically clean gate marks with materials such as polycarbonates, ABS, polyvinyl chloride, and the like.

Figure 5:
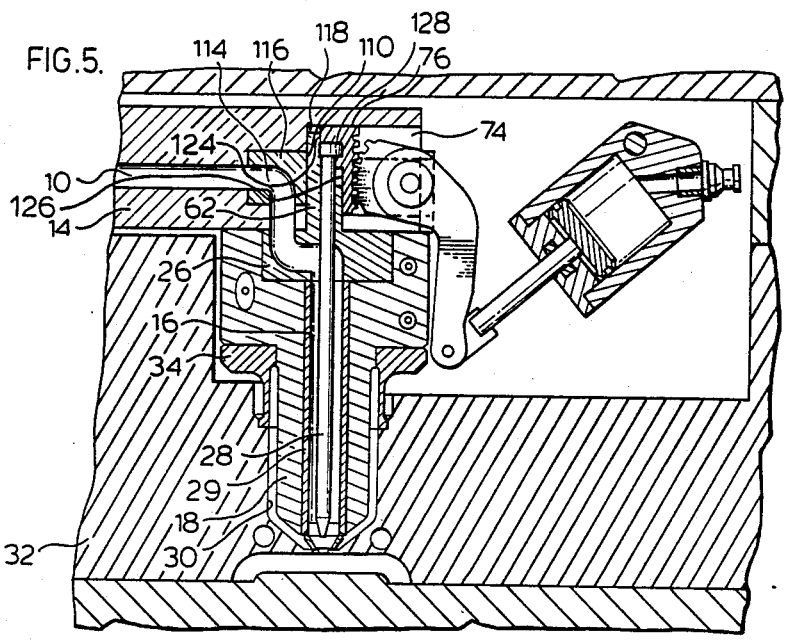
FIG. 5 is a sectional view of a portion of an injection molding system according to a second embodiment of the invention.
Figure 6:
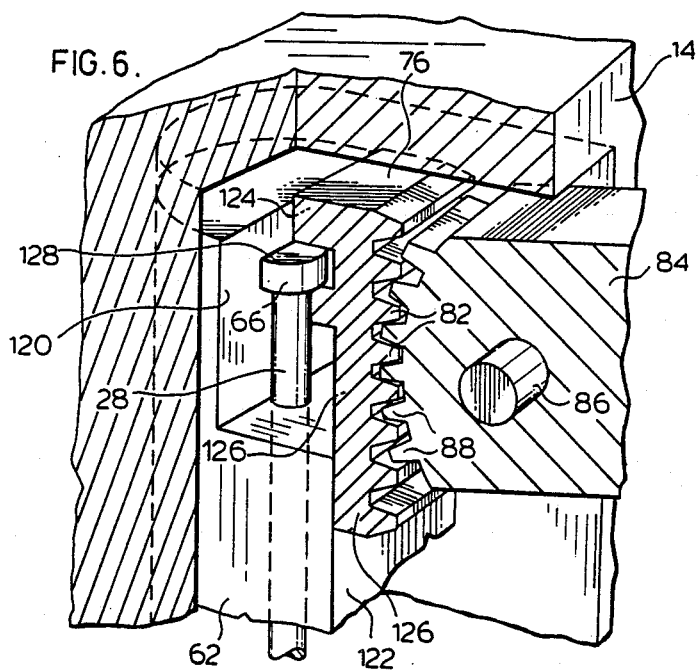
FIG. 6 is a cut-away isometric view showing how the rack member in FIG. 5 abuts against the valve pin bushing.

FIGS. 5 and 6 show an injection molding system according to another embodiment of the system. As many of the elements of this embodiment are the same as the first embodiment, elements common to both embodiments are described and illustrated using the same reference numerals. In this embodiment, the melt passage 10 branches from an inlet (not shown) in an elongated manifold 14 to a number of spaced nozzles 18 (only one of which is shown). Each nozzle 18 is seated in a well 30 in the cavity plate 32 with a structure as described above. In this case, the melt passage 10 has a bend 114 in the manifold 14 before extending into the valve pin bushing 26 where it connects to the central bore 16 around the valve pin 28. The bend 114 is made by suitably machining a plug 116 which is brazed in place in the manifold 14 as described in U.S. Pat. No. 4,609,138 to Harrison which issued Sept. 2, 1986.

The use of an elongated manifold 14 provides the additional problem in this embodiment of misalignment due to thermal expansion. While the nozzle 18 is accurately located in the well 30 by the insulation flange 34, the manifold expands and contracts longitudinally from where it is located in alignment with the central inlet (not shown). Thus it is not satisfactory to have the rack member 76 abut against the surface 110 of the slot 74 in the manifold 14. Rather, the valve pin bushing 26 has a different configuration with the rearwardly projecting portion 62 extending further into the slot 74 and having a space 118 between it and the surface 110 of the slot 74. As clearly seen in FIG. 6, the rearwardly projecting portion 62 of the valve pin bushing 26 has a rearward outwardly facing flat surface 120 and a forward outwardly facing flat surface 122. The rack member 76 also has a rearwardly inwardly facing flat surface 124 and a forward inwardly facing flat surface 126. As shown, the flat surfaces 124,126 of the rack member 76 abut against the flat surfaces 120,122 of the rearwardly projecting portion 62 of the valve pin bushing 26 as the rack member 76 and valve pin 28 are reciprocated by the pivotal action of the pinion member 84. Thus, substantially all of the lateral forces applied by the pinion member 84 to the rack member 76 are absorbed by the valve pin bushing 26 and not by the valve pin 28. As mentioned above, the valve pin 28 has an enlarged head 66 which is loosely received in a T-slot 78 on the rack member 76 which further ensures that lateral forces are not transferred to the valve pin 28 by the rack member 76. While the surfaces 120,122 of the valve pin bushing 26 and 124,126 of the rack member 76 are shown as being flat in this embodiment, they can have other shapes which match sufficiently to provide for the reciprocal sliding motion of the rack member 76. The head 66 of the valve pin 28 is made with one flat side 128 which abuts against the rearward outwardly facing flat surface 120 of the valve pin bushing 26 to prevent the valve pin 28 from rotating as it reciprocates. The feature is useful if the valve pin tip end 70 is shaped to fit an angled cavity and/or to provide a textured finish.

The pinion member 84 and the remainder of the valve pin actuating mechanism is the same as described above in regard to the first embodiment. Similarly, operation of the system is the same and the description need not be repeated. The difference is that in this embodiment the lateral forces from the rack member 76 are absorbed entirely by the valve pin bushing 26, whereas in the first embodiment the lateral forces are split between the manifold 14 and the valve pin bushing 26. It is, of course, apparent that the first embodiment can also be modified to have all of the lateral forces absorbed only by the manifold in a system where misalignment due to thermal expansion is not a problem.

While the description of the injection molding system with a rack and pinion actuating mechanism has been given with respect to preferred embodiments, it is not to be construed in a limiting sense. Variations and modifications will occur to those skilled in the art. For instance, it is apparent that the shapes and/or configurations of the pinion member 84, rack member 86 and slot 74 in the manifold 14 can be varied without applying unacceptable lateral forces to the driven end 68 of the valve pin 28 as it reciprocates. Reference is made to the appended claims for a definition of the invention.

What I claim is:

1. In a valve gated hot runner injection molding apparatus having a heated nozzle which is seated in a cavity plate and secured to a heated manifold, a pneumatically activated elongated valve pin which reciprocates longitudinally between a retracted open position and a forward closed position in a central bore in the nozzle which is in alignment with a gate extending through the cavity plate to a cavity, the valve pin having a driven end and a tip end which seats in the gate in the closed position, a melt passage to convey pressurized melt from an inlet in the manifold to the gate which extends through the manifold and along the valve pin in the central bore of the nozzle, and a valve pin bushing which is seated in the nozzle with a rearwardly extending portion which projects into the manifold, the valve pin bushing having a valve pin bore extending therethrough in alignment with the central bore of the nozzle to receive the valve pin therethrough to prevent substantial leakage of the pressurized melt around the reciprocating valve pin, the improvement wherein;
    (a) a rack member is longitudinally slidably received in a radial opening in the manifold to engage the driven end of the valve pin, the rack member having a toothed portion with a longitudinal row of teeth which face outwardly in the radial opening;
    (b) a pivotally mounted pinion member with a plurality of teeth which engage the teeth of the rack member, and
    (c) double acting pneumatic actuating means connected to pivot the pinion member through a predetermined angle according to a predetermined cycle whereby the rack member and the valve pin are reciprocated longitudinally between the open and closed positions, wherein the rack member has an inward surface which abuts against a matching surface of the radial opening in the manifold to retain the rack member in longitudinal alignment with the valve pin and absorb substantially all lateral forces received from the pinion member as the rack member and valve pin are reciprocated between the open and closed positions.

2. An injection molding apparatus as claimed in claim 1 wherein the driven end of the valve pin has an enlarged head which is centrally received in a matching slot in the rack member.

3. An injection molding apparatus as claimed in claim 1 wherein the toothed portion of the rack member partially overlaps the rearwardly extending portion of the valve pin bushing, the toothed portion of the rack member having an inwardly facing surface which is in slidable bearing contact against a matching outwardly facing surface of the rearwardly extending portion of the valve pin bushing.

4. An injection molding apparatus as claimed in claim 3 wherein the matching surfaces of the toothed portion of the rack member and the rearwardly extending portion of the valve pin bushing are flat.

5. An injection molding apparatus as claimed in claim 2 wherein the rearward extending portion of the valve pin bushing has at least one outwardly facing surface and the rack member has at least one inwardly facing surface which abuts against said outwardly facing surface to receive substantially all lateral forces applied by the pinion member as the rack member and valve pin are reciprocated between the open and closed positions.

6. An injection molding apparatus as claimed in claim 5 wherein the said at least one inwardly facing surface of the rack member and the said at least one outwardly facing surface of the rearward extending portion of the valve pin bushing match each other.

7. An injection molding apparatus as claimed in claim 5 wherein the said at least one inwardly facing surface of the rack member and the said at least one outwardly facing surface of the rearward extending portion of the valve pin bushing are flat.

8. An injection molding apparatus as claimed in claim 2 wherein the rearward extending portion of the valve pin bushing has a rearward outwardly facing flat surface and a forward outwardly facing flat surface and the rack member has a rearward inwardly facing flat surface and a forward inwardly facing flat surface, the rearward inwardly facing flat surface of the rack member abutting against the rearward outwardly facing flat surface of the valve pin bushing and the forward inwardly facing flat surface of the rack member abutting against the forward outwardly facing flat surface of the valve pin bushing whereby substantially all of the lateral forces applied by the pinion member to the rack member are absorbed by the valve pin bushing as the rack member and the valve pin are reciprocated between the open and closed positions.

9. An injection molding apparatus as claimed in claim 8 wherein the valve pin head has one flat side which abuts against the rearward outwardly facing flat surface of the valve pin bushing, thus preventing rotation of the valve pin as it reciprocates.

10. An injection molding apparatus as claimed in claim 1 wherein the pinion member is pivotally mounted on the manifold.

11. An injection molding apparatus as claimed in claim 1 wherein the actuating means includes a piston which reciprocates in a cylinder, the piston being connected to the pinion member by a connecting rod.

12. An injection molding apparatus as claimed in claim 5 wherein the pinion member is pivotally mounted on the manifold.

13. An injection molding apparatus as claimed in claim 5 wherein the actuating means includes a piston which reciprocates in a cylinder, the piston being connected to the pinion member by a connecting rod.

* * * * *